UNITED STATES PATENT OFFICE.

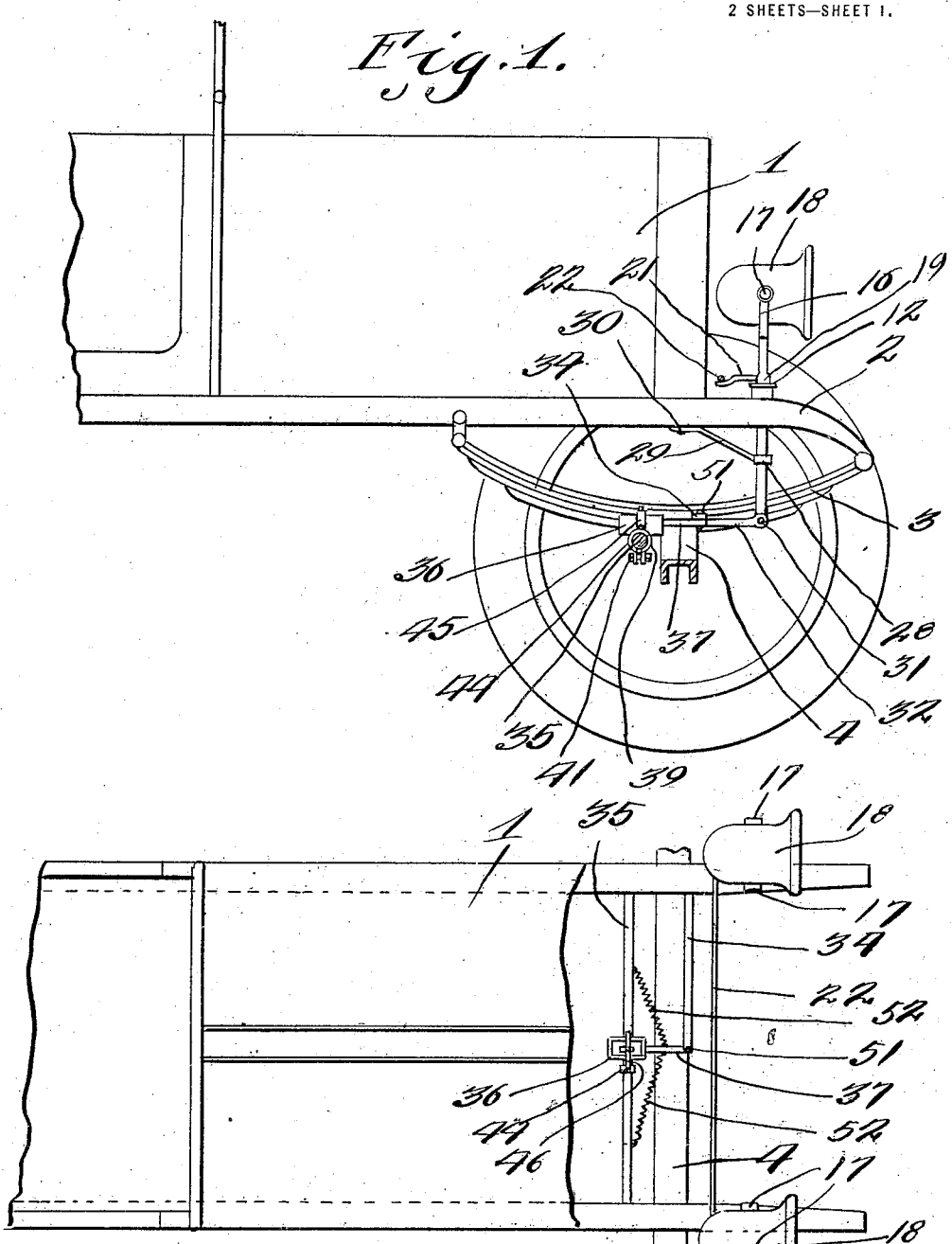

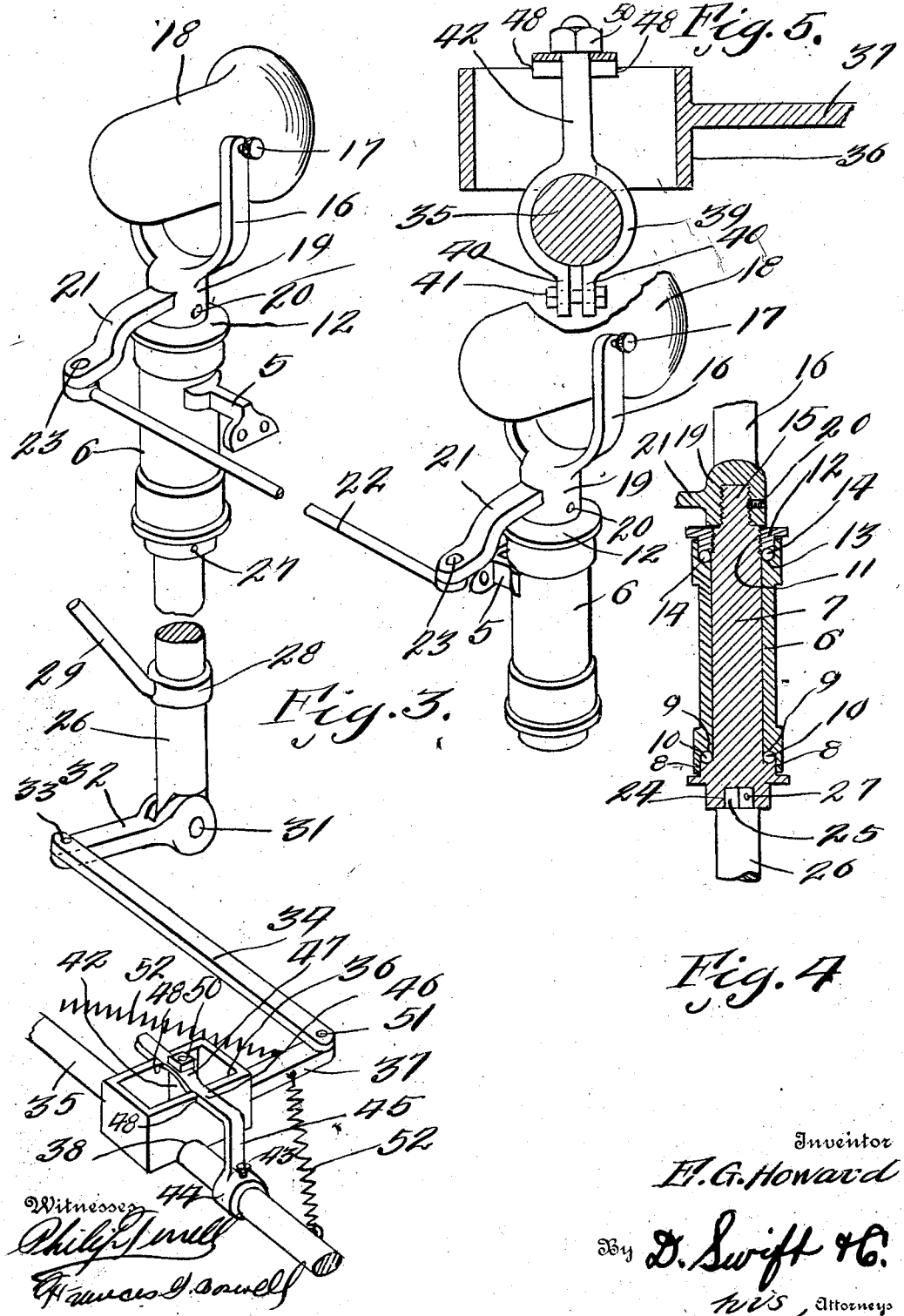

ELMER G. HOWARD, OF SPRINGVIEW, NEBRASKA.

AUTOMATIC DIRIGIBLE LAMP MECHANISM FOR AUTOMOBILES.

1,151,880.  Specification of Letters Patent.  Patented Aug. 31, 1915.

Application filed May 15, 1915. Serial No. 28,382.

*To all whom it may concern:*

Be it known that I, ELMER G. HOWARD, a citizen of the United States, residing at Springview, in the county of Keyapaha and State of Nebraska, have invented a new and useful Automatic Dirigible Lamp Mechanism for Automobiles; and I do hereby declare the following to be a full, clear, and exact description of the invention, such as will enable others skilled in the art to which it appertains to make and use the same.

This invention relates to an automatic dirigible lamp mechanism for automobiles.

An object of the invention is to provide a mechanism of this character interposed between the lamps and the transverse rod (which connects the knuckles of the front wheels), whereby as the front wheels are turned in one direction or the other, the lamps are correspondingly thrown or moved.

Another object of the invention is the provision of means to prevent the lamp from vertical vibration, incident to the wheels passing over rough roads.

A further object of the invention is the provision of means to prevent lateral vibration of the lamps, incident to the front wheels vibrating laterally.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation of a portion of an automobile, showing parts in section, and improved mechanism as applied. Fig. 2 is a plan view of a portion of the automobile, showing parts broken away, showing the mechanism in plan view. Fig. 3 is an enlarged detail perspective view of the lamps, and the mechanism for operating the lamps, incident to the movement of the front wheels to the right or the left. Fig. 4 is a vertical sectional view through one of the bearings or mountings of the lamp bracket. Fig. 5 is a transverse sectional view through the connections to the transverse rod, which connects the knuckles of the front wheels.

Referring to the drawings, 1 designates a portion of an automobile, and 2 the frame, and 3 the usual springs supporting the frame on the usual front axle 4. Secured to the frame 2 by any suitable means are the brackets 5, which support the sleeve bearings 6 integral therewith. Mounted in each of the sleeve bearings is a spindle 7, between the lower shoulders 8 of which and the shoulders 9 on the interior of the lower portion of the bearing 6 ball bearings 10 are interposed. The upper end of each spindle 7 is threaded as at 11, to which the cap sleeve 12 is threaded. Interposed between the cap sleeves 12 and the annular shoulders 13 of the sleeve bearings 6 are ball bearings 14. The ball bearings 10 and 14 act to permit the spindle 7 to easily rock in its bearing. Each spindle 7 is constructed with a reduced extension 15 (which is threaded). The U-shaped brackets 16 pivotally support as at 17, the usual lamps 18. The lower portions of the brackets 16 are provided with interiorly threaded sockets 19 to engage the threaded reduced extensions 15, there being suitable threaded pins 20 to lock the sockets on said extension. The sockets 19 are provided with laterally extending arms 21, which are connected by the rod 22, as at 23, so that when one spindle 7 is rocked in its bearing, the other spindle in the opposite bearing is correspondingly rocked, so as to turn the lamps in one direction or the other horizontally.

The lower end of one of the spindles 7 is provided with a rectangular socket 24, to receive a correspondingly constructed reduced extension 25 of a second spindle 26, there being a pin 27 to hold the extension 25 in the socket 24. The second spindle 26 is mounted in an additional bearing 28 of a bracket 29, which is connected, as shown in Fig. 1, at 30 to the frame of the automobile. Pivoted at 31 to the lower end of the second spindle 26 is an arm or link 32, which is allowed to move vertically, and to one end of which arm or link 32, as at 33, a link 34 is connected. The usual transverse rod 35 (which connects the usual knuckles, not shown, between the front wheels and the axle 4) is provided, and mounted upon this transverse rod 35, so that the rod may move a trifle transversely thereof is a yoke 36 having an arm 37. The lower edges of the yoke 36 are recessed partially as shown at 38, through which recesses the transverse rod 35 partially moves. Carried by the rod 35 is a split clamp 39, the ears 40 of which receive the bolts 41, so as to hold the clamp to the rod. The upper portion of the clamp has a pin 42, which extends through the yoke 36.

Secured on the rod 35 by a suitable set screw 43 is a sleeve 44 having an arm 45 extending upwardly, which arm is spaced a slight distance from the yoke, upon one side thereof. This arm has a laterally extending flat spring member 46, bowed upwardly in the center as at 47. The flat spring 46 engages the recesses 48 in the upper edges of the opposite sides of the yokes 36, so as to hold the yoke yieldably on the transverse rods 35, and the recesses 38 firmly in engagement with the rods. It is to be observed that the pin 42 extends through the bowed portion 47 of the flat spring 46 and has threaded thereto a suitable nut 50, whereby the tension of the flat spring 46 may be regulated. It is to be observed that by this construction, that any undue vertical vibration of the lamps will cause the yoke to slightly rock vertically on the transverse rod 35, that is, in case the vertical vibration of the front wheels is great enough and the joint 31 binds. The joint 31 is designed for the purpose of preventing the vertical vibration of the front wheels from affecting the lamps, and the vertical vibration of the frame of the automobile (which frame supports the lamps) causing the yoke to slightly swivel vertically on the rod 35. It is to be observed that when the rod 35 is reciprocated transversely in one direction or the other by the steering mechanism (not shown), for turning the front wheels in one direction or the other, the rod 35 will move a trifle until the pin 42 contacts with one side or the other of said yoke, after which the yoke will move with the rod 35 as one body, with the arm 37 of the yoke extending directly at right angles to the rod 35. When the rod 35 is so moved and the arm 37 (which is pivotally connected at 51 to the link 34) with it, the arm 32 is rocked, which correspondingly rocks the second spindle 26, causing one of the lamps to move correspondingly with the front wheels, and owing to the provision of the connecting rod 22, the other lamp will likewise move or oscillate. Suitable springs 52 connect the arm 37 and the rod 35, so as to hold the yoke central with relation to the pin 42. It is to be observed that any trifle lateral vibration or oscillation of the front wheels will not affect the positions of the lamps, owing to the pin 42 being spaced apart from the opposite sides of the yoke and substantially centrally therebetween. In other words, the rod 35 may move a trifle transversely in either direction, without causing the pin 42 to contact with the opposite sides of the yoke, in which case the position of the lamps will not be disturbed.

The invention having been set forth, what is claimed as new and useful is:—

1. In combination with an automobile frame, lamps having spindles mounted in bearings of the frame, a connection between the lamps so that when one is moved the other moves with it correspondingly, a transversely movable rod adapted to connect the knuckles of the front wheels of an automobile, a yoke slidably mounted on the rod and having connections with one of the spindles of one of the lamps, and means spaced from the opposite sides of the yoke to cause the yoke to move with the rod, but permit a slight independent transverse vibration of the rod.

2. In combination with an automobile frame, lamps having spindles mounted in bearings of the frame, a connection between the lamps so that when one is moved the other moves with it correspondingly, a transversely movable rod adapted to connect the knuckles of the front wheels of an automobile, a yoke slidably mounted on the rod and having connections with one of the spindles of one of the lamps, means spaced from the opposite sides of the yoke to cause the yoke to move with the rod, but permit a slight independent transverse vibration of the rod, said yoke being elongated and having means to permit it to rock a trifle vertically on said rod.

3. In combination with an automobile frame, lamps having spindles mounted in bearings of the frame, a connection between the lamps so that when one is moved the other moves with it correspondingly, a transversely movable rod adapted to connect the knuckles of the front wheels of an automobile, a yoke slidably mounted on the rod and having connections with one of the spindles of one of the lamps, means spaced from the opposite sides of the yoke to cause the yoke to move with the rod, but permit a slight independent transverse vibration of the rod, said yoke being elongated and having means to permit it to rock a trifle vertically on said rod, and means to hold said yoke centered with relation to the first means.

4. In combination with an automobile frame, lamps having spindles mounted in bearings of the frame, a connection between the lamps so that when one is moved the other moves with it correspondingly, a transversely movable rod adapted to connect the knuckles of the front wheels of an automobile, a yoke slidably mounted on the rod and having connections with one of the spindles of one of the lamps, means to permit the rod to yield with relation to the yoke before the yoke moves with the rod, means to cause the yoke to move with the rod, and means to permit the yoke to rock a trifle on the rod.

5. In combination with an automobile frame, lamps having spindles mounted in bearings of the frame, a connection between the lamps so that when one is moved the other moves with it correspondingly, a transversely movable rod adapted to connect the knuckles of the front wheels of an automobile, a yoke having the edges of its opposite sides recessed to engage said rod, a pin on the rod extending upwardly through the yoke and being spaced centrally between the opposite sides of the yoke, a flat spring on the top of the yoke and carried by the pin to hold the yoke slightly rockable on the rod yieldably, said yoke having connections with one of the spindles of one of the lamps, and means for yieldably holding the yoke on the rod with the pin substantially centrally disposed between the opposite sides of the yoke.

In testimony whereof I have signed my name to this specification in the presence of two subscribing witnesses.

ELMER G. HOWARD.

Witnesses:
Ross AMSPOKER,
R. C. McCULLEY.